United States Patent
Wang et al.

(10) Patent No.: US 11,216,334 B1
(45) Date of Patent: Jan. 4, 2022

(54) DATA READING METHOD, MEMORY STORAGE DEVICE AND MEMORY CONTROL CIRCUIT UNIT

(71) Applicant: PHISON ELECTRONICS CORP., Miaoli (TW)

(72) Inventors: Wei-Jeng Wang, Taipei (TW); Shao-Hung Lu, Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/002,783

(22) Filed: Aug. 26, 2020

(30) Foreign Application Priority Data

Jul. 28, 2020 (TW) .................................. 109125459

(51) Int. Cl.
| | | |
|---|---|---|
| *G06F 11/10* | (2006.01) | |
| *G06F 13/28* | (2006.01) | |
| *G06F 11/30* | (2006.01) | |
| *G06F 11/16* | (2006.01) | |
| *G06F 3/06* | (2006.01) | |

(52) U.S. Cl.
CPC ........ *G06F 11/1048* (2013.01); *G06F 3/0619* (2013.01); *G06F 3/0659* (2013.01); *G06F 3/0679* (2013.01); *G06F 11/1068* (2013.01); *G06F 11/3037* (2013.01)

(58) Field of Classification Search
CPC .. G06F 11/1048; G06F 3/0619; G06F 3/0659; G06F 3/0679; G06F 11/1068; G06F 11/3037
See application file for complete search history.

(56) References Cited

U.S. PATENT DOCUMENTS

| | | | | |
|---|---|---|---|---|
| 6,315,207 | B1 * | 11/2001 | Eisele .................... | G06F 3/0607 235/481 |
| 9,176,812 | B1 * | 11/2015 | Northcott ............ | G06F 11/1068 |
| 10,755,798 | B2 * | 8/2020 | Yang .................... | G11C 29/4401 |
| 10,871,924 | B1 * | 12/2020 | Lin ........................ | G06F 3/0619 |
| 2008/0294954 | A1 * | 11/2008 | Katagiri ................ | G06F 3/0617 714/727 |
| 2009/0235145 | A1 * | 9/2009 | Ito .......................... | G11C 29/72 714/764 |
| 2013/0007300 | A1 * | 1/2013 | Candelaria ............ | G06F 3/0683 710/5 |
| 2014/0181372 | A1 * | 6/2014 | Liu ...................... | G06F 12/0246 711/103 |

(Continued)

*Primary Examiner* — Guy J Lamarre
(74) *Attorney, Agent, or Firm* — JCIPRNET

(57) ABSTRACT

A data reading method is provided. The method includes: according to a first read command received from a host system, sending a first read command sequence, which is configured to instruct a reading of a plurality of physical units of the rewritable non-volatile memory module to obtain first data; identifying data stored in at least one first physical unit in the physical units as uncorrectable data according to the first data; according to a second command received from the host system, sending a second read command sequence, which is configured to instruct a reading of the physical units of the rewritable non-volatile memory module to obtain second data; generating response data corresponding to the second read command according to the second data and padding data, which is configured to replace the data read from the at least one first physical unit; and transmitting the response data to the host system.

21 Claims, 11 Drawing Sheets

(56) References Cited

U.S. PATENT DOCUMENTS

| | | | |
|---|---|---|---|
| 2017/0024136 A1* | 1/2017 | Tan | G06F 3/0679 |
| 2017/0083402 A1* | 3/2017 | Vishne | G06F 11/1076 |
| 2020/0026464 A1* | 1/2020 | Yen | G06F 3/061 |
| 2020/0174886 A1* | 6/2020 | Li | G06F 3/0638 |
| 2021/0064449 A1* | 3/2021 | Tan | G06F 12/0246 |

* cited by examiner

DATA READING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 109125459, filed on Jul. 28, 2020. The entirety of the above-mentioned patent application is hereby incorporated by reference herein and made a part of this specification.

BACKGROUND

1. Technology Field

The invention relates to a data reading technique, and more particularly, to a data reading method for a rewritable non-volatile memory module, a memory control circuit unit and a memory storage device.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

Generally, data written to the rewritable non-volatile memory module is encoded according to an error correcting code, and data read from the rewritable non-volatile memory module is also decoded through a corresponding procedure. When a host system receives a piece of uncorrectable data (i.e., errors with uncorrectable error correction code (UECC) occurred in this piece of data) from the rewritable non-volatile memory module, the host system may try to read this piece of data repeatedly so the uncorrectable data can be decoded again.

Accordingly, if a part of data in a piece of continuous data is the uncorrectable data, the remaining data can be sent to the host system only after this part of data is decoded again and sent to the host system. In other words, before this part of data undergoes a re-decoding operation and is sent to the host system, even though the remaining data is ready in the buffer, it cannot be sent to the host system. Consequently, a read response time is too long, and thus the overall performance of the rewritable non-volatile memory module is reduced.

SUMMARY

The invention relates to a data reading method, a memory storage device and a memory control circuit unit capable of solving the above problem and effectively improving the performance of the memory storage device.

A data reading method for a rewritable non-volatile memory module is provided according to embodiments of the invention. The data reading method includes the following steps. A first read command is received from a host system, and a first read command sequence is sent according to the first read command. The first read command sequence is configured to instruct a reading of a plurality of physical units of the rewritable non-volatile memory module to obtain first data. Data stored in at least one first physical unit in the physical units is identified as uncorrectable data according to the first data. A second command is received from the host system, and a second read command sequence is sent according to the second read command. The second read command sequence is configured to instruct a reading of the physical units of the rewritable non-volatile memory module to obtain second data. Response data corresponding to the second read command is generated according to the second data and padding data. The padding data is configured to replace data read from the at least one first physical unit. The response data is transmitted to the host system.

An exemplary embodiment of the invention further provides a memory storage device, which includes a connection interface unit, a rewritable non-volatile memory module and a memory control circuit unit. The connection interface unit is configured to couple to a host system. The memory control circuit unit is coupled to the connection interface unit and the rewritable non-volatile memory module. The memory control circuit unit is configured to receive a first read command from a host system, and send a first read command sequence according to the first read command. The first read command sequence is configured to instruct a reading of a plurality of physical units of the rewritable non-volatile memory module to obtain first data. The memory control circuit unit is further configured to identify data stored in at least one first physical unit in the physical units as uncorrectable data according to the first data. The memory control circuit unit is further configured to receive a second command from the host system, and send a second read command sequence according to the second read command. The second read command sequence is configured to instruct a reading of the physical units of the rewritable non-volatile memory module to obtain second data. The memory control circuit unit is further configured to generate response data corresponding to the second read command according to the second data and padding data. The padding data is configured to replace data read from the at least one first physical unit. The memory control circuit unit is further configured to transmit the response data to the host system.

Another exemplary embodiment of the invention provides a memory control circuit unit, which is configured to control a rewritable non-volatile memory module. The memory control circuit unit includes a host interface, a memory interface and a memory management circuit. The host interface is configured to couple to a host system. The memory interface is configured to couple to the rewritable non-volatile memory module. The memory management circuit is coupled to the host interface and the memory interface. The memory management circuit is configured to receive a first read command from a host system, and send a first read command sequence according to the first read command. The first read command sequence is configured to instruct a reading of a plurality of physical units of the rewritable non-volatile memory module to obtain first data. The memory management circuit is further configured to identify data stored in at least one first physical unit in the physical units as uncorrectable data according to the first data. The memory management circuit is further configured to receive a second command from the host system, and send a second read command sequence according to the second read command. The second read command sequence is configured to instruct a reading of the physical units of the rewritable non-volatile memory module to obtain second data. The memory management circuit is further configured to generate response data corresponding to the second read command according to the second data and padding data. The padding data is configured to replace data read from the at least one first physical unit. The memory management circuit is further configured to transmit the response data to the host system.

Based on the above, by recording mark information of a physical unit storing the uncorrectable data, when reading these uncorrectable data in continuous data again, the host system can use the mark information to avoid invalid decoding operations on these uncorrectable data, thereby improving the overall read performance of the memory storage device.

To make the aforementioned more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

DESCRIPTION OF THE EMBODIMENTS

Figure 1:
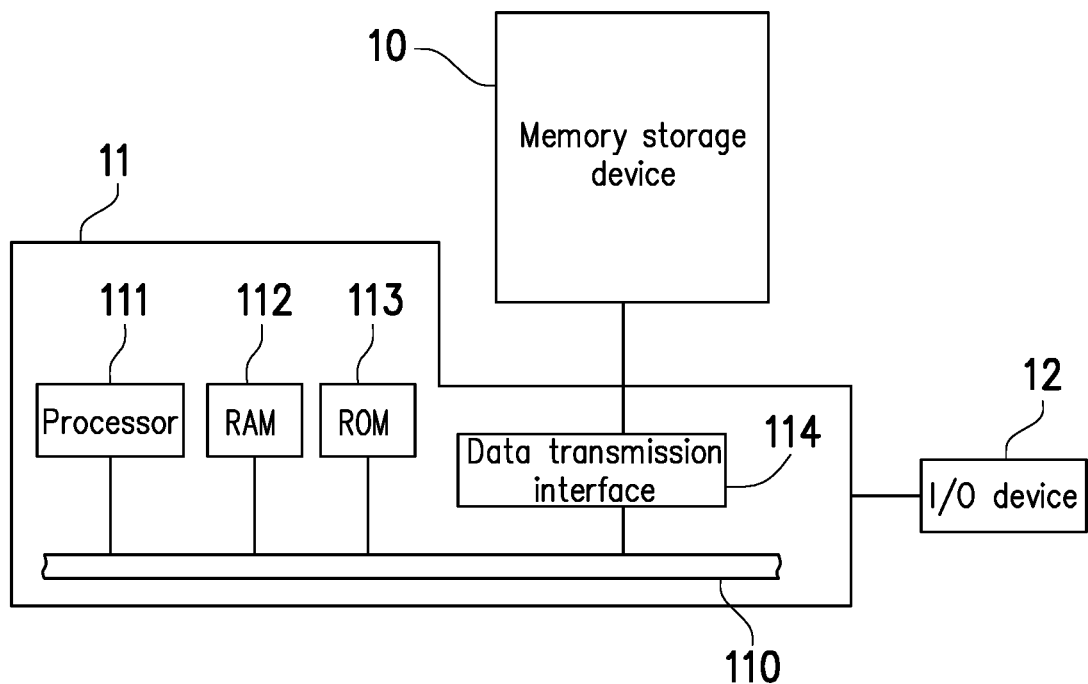
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the invention may comprise any one or more of the novel features described herein, including in the detailed description, and/or shown in the drawings. As used herein, "at least one," "one or more," and "and/or" are open-ended expressions that are both conjunctive and disjunctive in operation. For instance, each of the expressions "at least on of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
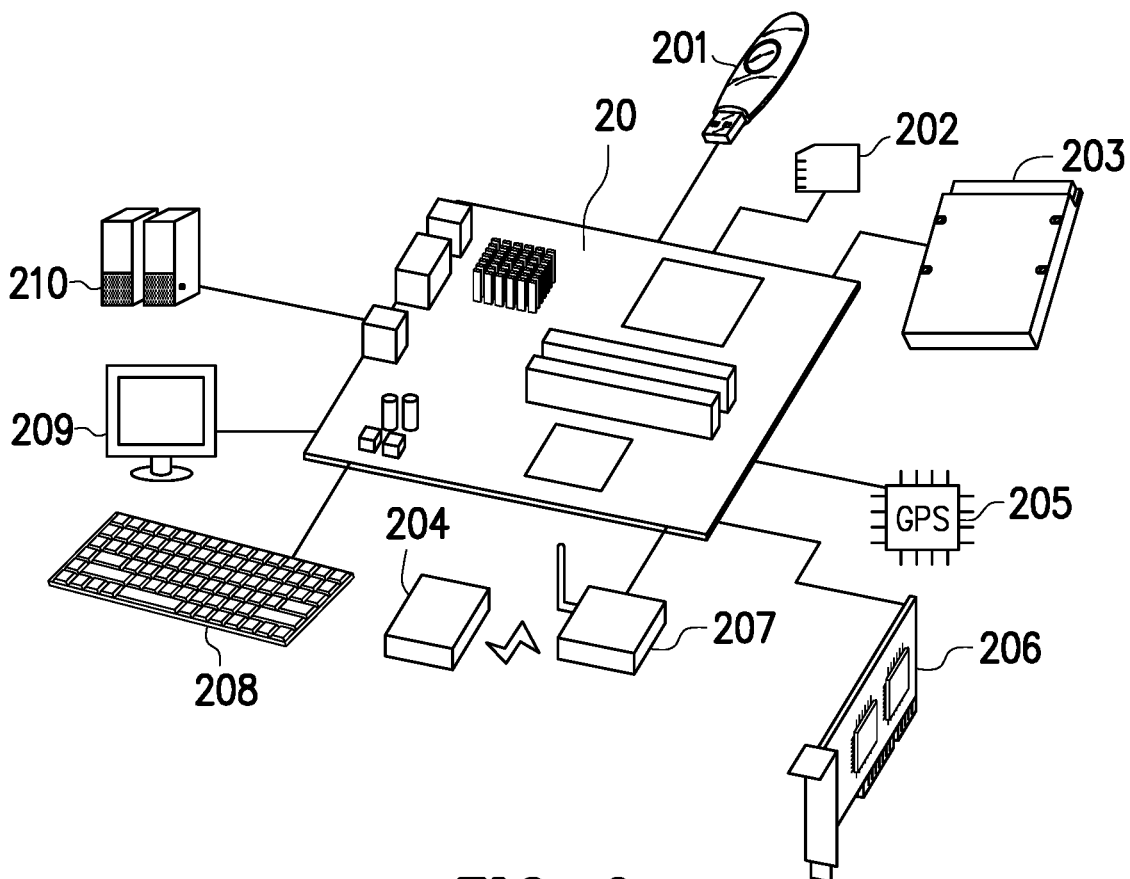
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In this exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
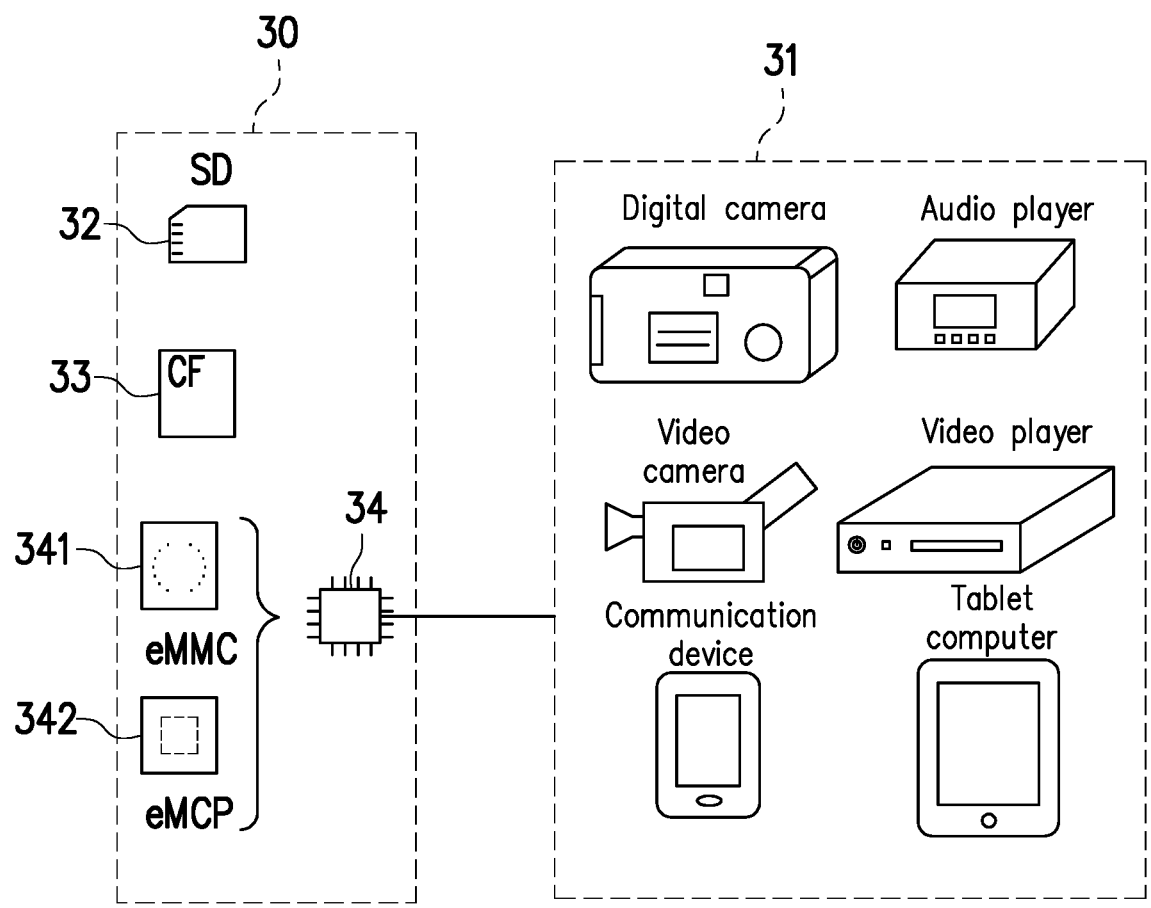
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
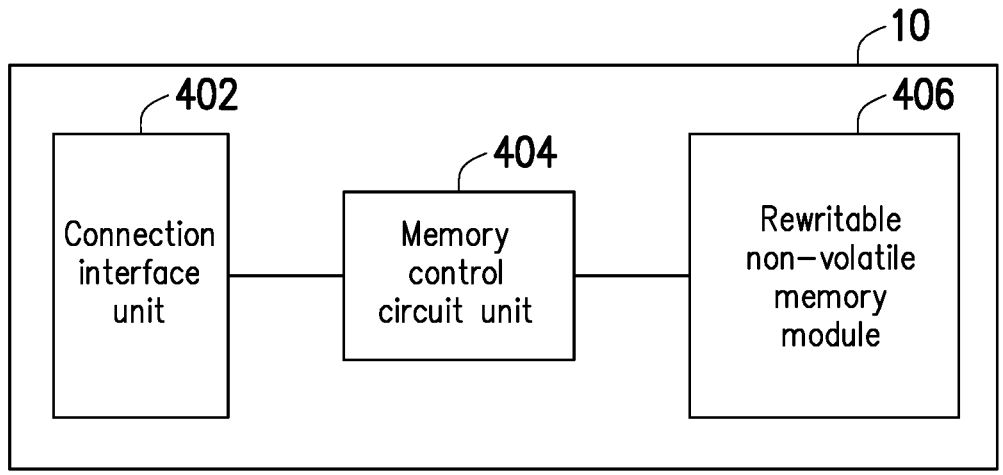
FIG. 4 is a schematic block diagram illustrating a memory storage device according to an exemplary embodiment of the invention.

FIG. 4 is a schematic block diagram illustrating a memory storage device according to an exemplary embodiment of the invention. Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In the present exemplary embodiment, the connection interface unit 402 is compatible with a SATA (Serial Advanced Technology Attachment) standard. Nevertheless, it should be understood that the invention is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quad Level Cell) NAND-type flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 may constitute a plurality of physical programming units, and the physical programming units can constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area contains multiple physical sectors configured to store user data, and the redundant bit area is configured to store system data (e.g., management data such as an error correcting code, etc.). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
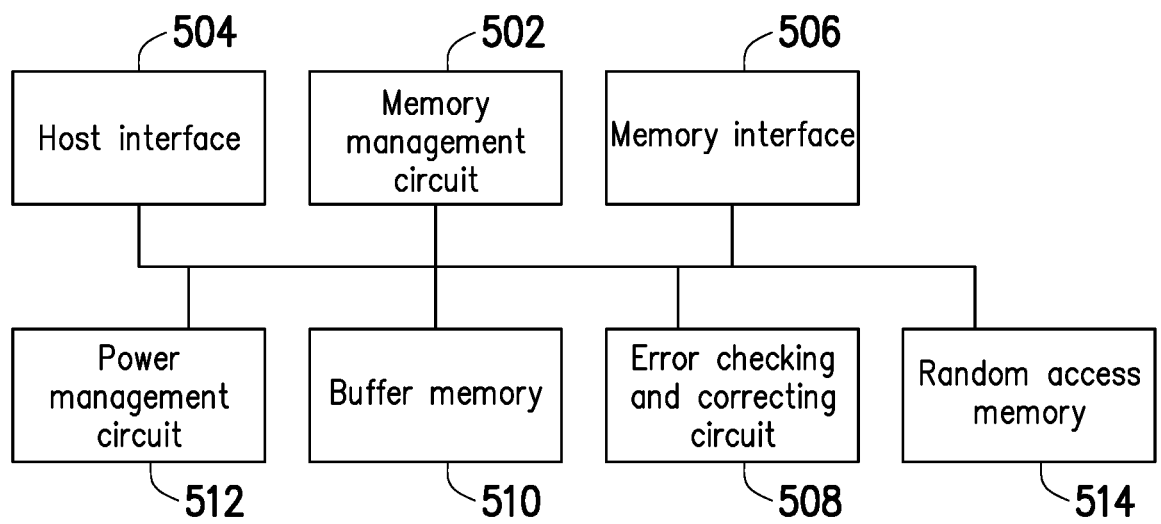
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention. Referring to FIG. 5, the memory control circuit unit 404 includes a memory management circuit 502, a host interface 504, a memory interface 506 and an error checking and correcting circuit 508.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to execute operations of writing, reading or erasing data.

In another exemplary embodiment, the control commands of the memory management circuit 502 may also be stored as program codes in a specific area (e.g., the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to send a write command sequence for the rewritable non-volatile memory module 406 to write data into the rewritable non-volatile memory module 406. The memory reading circuit is configured to send a read command sequence for the rewritable non-volatile memory module 406 to read data from the rewritable non-volatile memory module 406. The memory erasing circuit is configured to send an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further send command sequence of other types to the rewritable non-volatile memory module 406 for instructing to perform the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. Nevertheless, it should be understood that the invention is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence which instructs a writing of data, the read command sequence which instructs a reading of data, the erase command sequence which instructs an erasing of data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence;

The error checking and correcting circuit (a.k.a. a decoding circuit) 508 is coupled to the memory management circuit 502 and configured to execute an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

In an exemplary embodiment, the memory control circuit unit 404 further includes a buffer memory 510, a power management circuit 512 and a random access memory 514. The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10. The random access memory 514 is configured to temporarily store data or firmware programs for calculations.

In an exemplary embodiment, the rewritable non-volatile memory module 406 of FIG. 4 is also known as a flash memory module, and the memory control circuit unit 404 is also known as a flash memory controller for controlling the flash memory module. In an exemplary embodiment, the memory management circuit 502 of FIG. 5 is also known as a flash memory management circuit.

Figure 6:
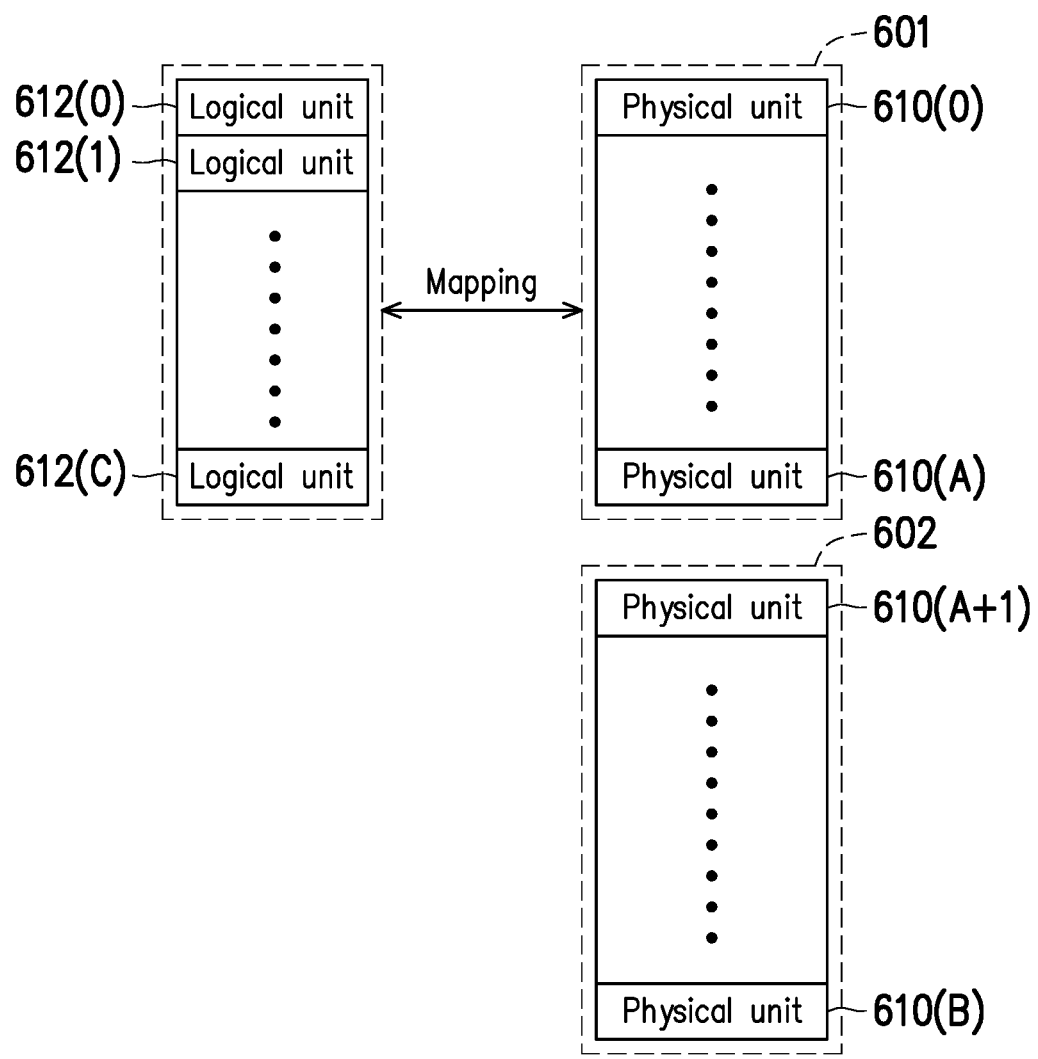
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention. Referring to FIG. 6, the memory management circuit 502 can logically group physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is regarded as a damaged physical unit. It should be noted that, if there are no available physical erasing units in the replacement area 602, the memory management circuit 502 may declare the memory storage device 10 as in a write protect state so data can no longer be written thereto.

In the present exemplary embodiment, each physical unit refers to one physical programming unit. However, in another exemplary embodiment, one physical unit may also refer to one physical address, one physical erasing unit, or a composition of a plurality of continuous or discontinuous physical addresses. The memory management circuit 502 assigns logical units 612(0) to 612(C) for mapping to the physical units 610(0) to 610(A) in the storage area 601. In this exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 can record a mapping relation (a.k.a. a logical-physical address mapping relation) between the logical units and the physical units into at least one logical-physical address mapping table. When the host system 11 intends to read the data from the memory storage device 10 or write the data into the memory storage device 10, the memory management circuit 502 can perform a data accessing operation on the memory storage device 10 according to the logical-physical address mapping table.

In this exemplary embodiment, when the host system 11 intends to read data in the memory storage device 10, the host system 11 sends a read command to the memory management circuit 502. The memory management circuit 502 sends a read command sequence according to the read command, so as to read data corresponding to the received read command from the physical units in the rewritable non-volatile memory module 406. In particular, when the data corresponding to the read command from the host system 11 is uncorrectable data, the host system 11 will send a read command again to try to read the same data. In addition, when the data corresponding to the read command from the host system 11 is important data such as file system data or a system log file, if the read response time is too long, the host system 11 will also send a read command again to try to read the same data.

Figure 7A:
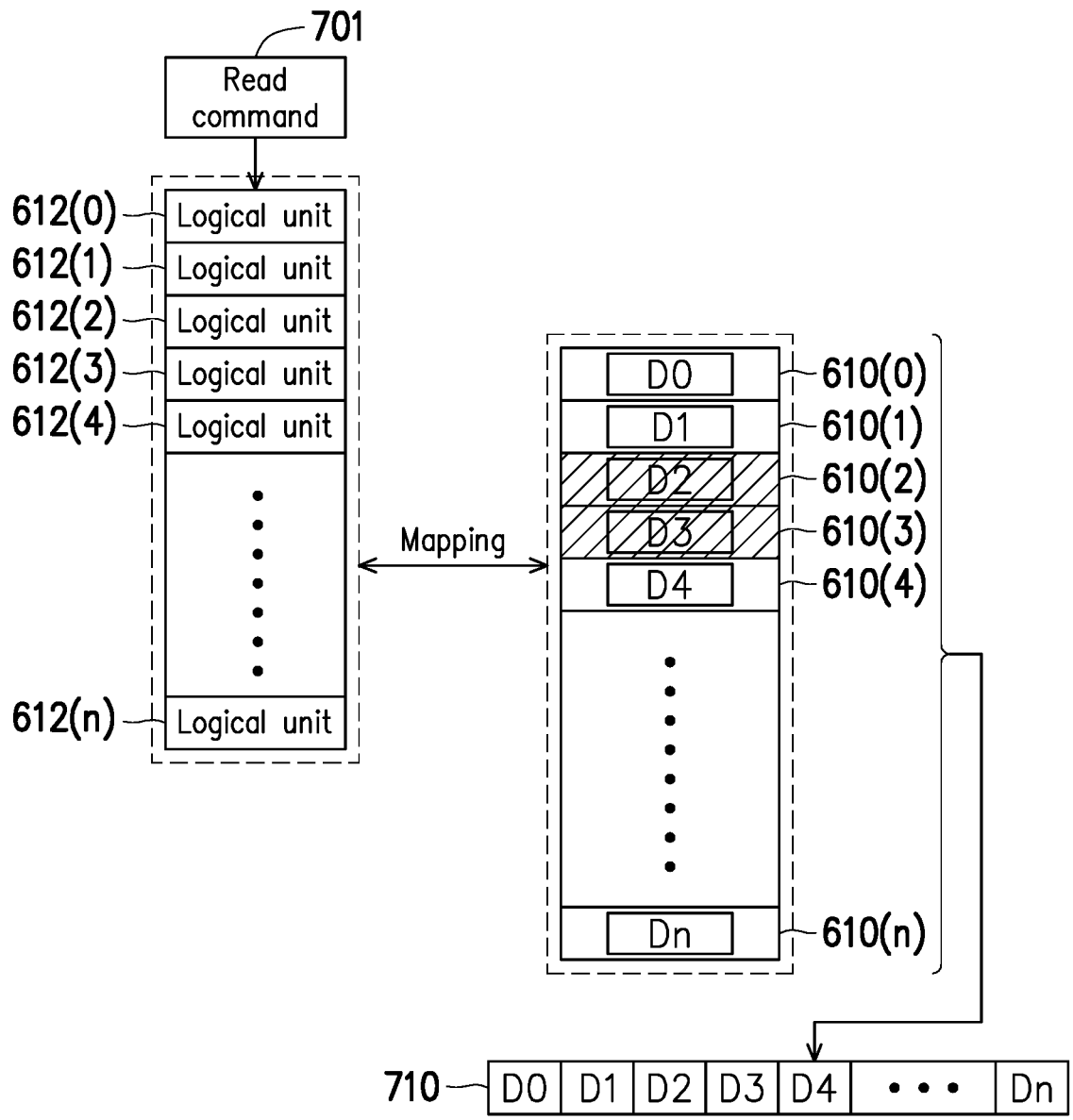
FIG. 7A and FIG. 7B are schematic diagrams illustrating an example of a data reading method according to another exemplary embodiment of the invention.
Figure 7B:
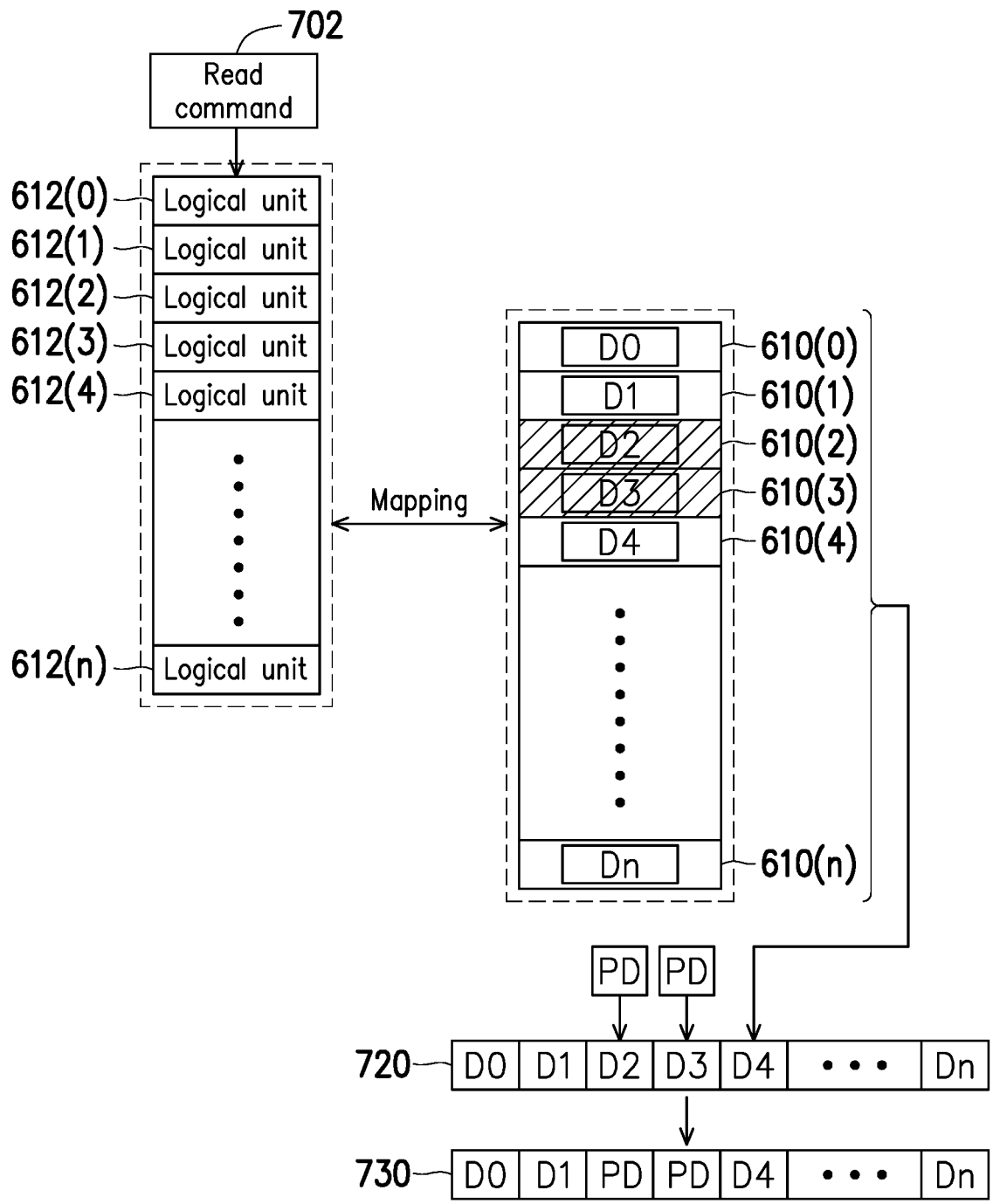

FIG. 7A and FIG. 7B are schematic diagrams illustrating an example of a data reading method according to another exemplary embodiment of the invention.

Referring to FIG. 7A, in this exemplary embodiment, when the memory management circuit 502 receives a read command 701 (a.k.a. a first read command 701) configured to read logical units 612(0) to 612(n) from the host system 11, the memory management circuit 502 sends a read command sequence (a.k.a. a first read command sequence) according to the first read command 701. Here, the first read command sequence is configured to instruct a reading of physical units 610(0) to 610(n) corresponding to the logical unit 612(0) to 612(n) in the rewritable non-volatile memory module 406, so as to obtain data D1 to data Dn (a.k.a. first data 710) in the physical units 610(0) to 610(n). For example, the first data 710 includes the data D1 to the data Dn in the physical units 610(0) to 610(n).

In particular, in this exemplary embodiment, the memory management circuit 502 can identify the data D2 and the data D3 stored in the physical units 610(2) and 610(3) (a.k.a. at least one first physical unit 610(2)~610(3)) in the physical units 610(0) to 610(n) as the uncorrectable data according to the first data 710. Here, the memory management circuit 502 decodes the first data 710, and identifies the data D2 and the data D3 stored in the at least one first physical unit 610(2)~610(3) as the uncorrectable data according to a decoding result of the first data 710. For example, the decoding result may be the number of error bits in the data D2 and the data D3 exceeding the number of error bits that can be corrected, uncorrectable addresses at which the error bits in the data D2 and the data D3 are located, or uncorrectable data in transient state caused by high and low temperature changes during the operation of the memory storage device 10.

Referring to FIG. 7B, when the first data 710 corresponding to the first read command 701 from the host system 11 includes the uncorrectable data, the host system 11 will send a read command 702 (a.k.a. a second read command 702) again to try to read the same data. Accordingly, the memory management circuit 502 receives the second command 702 from the host system 11, and sends a read command sequence (a.k.a. a second read command sequence) according to the second read command. Here, the second read command sequence is configured to instruct a reading of the physical units 610(0) to 610(n) corresponding to the logical unit 612(0) to 612(n) in the rewritable non-volatile memory module 406, so as to obtain the data D1 to the data Dn (a.k.a. second data 720) in the physical units 610(0) to 610(n). For example, the second data 720 also includes the data D1 to the data Dn in the physical units 610(0) to 610(n). Next, because the data D2 and the data D3 read from the at least one first physical unit 610(2)~610(3) are the uncorrectable data, the memory management circuit 502 uses padding data PD to replace the data D2 and the data D3 read from the at least one first physical unit 610(2)~610(3) to generate response data 730 corresponding to the second read command 702. Here, the padding data PD is, for example, 0x00. However, the invention is not limited in this regard.

Figure 8A:
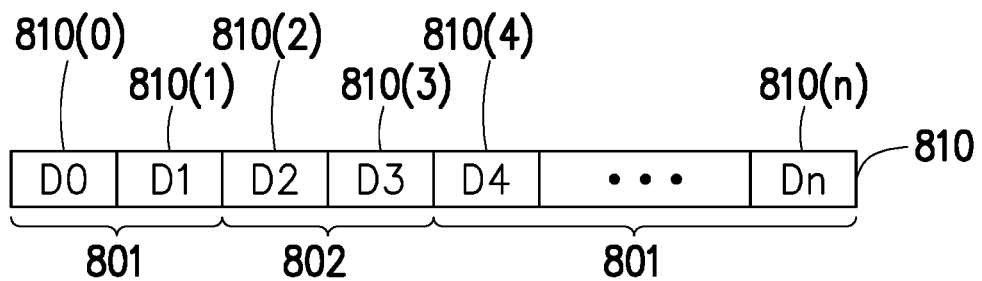
FIG. 8A and FIG. 8B illustrate a buffer queue in a buffer memory management method according to an exemplary embodiment of the invention.
Figure 8B:
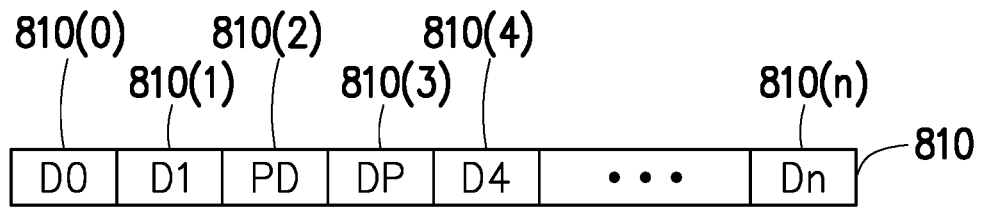
Figure 9A:
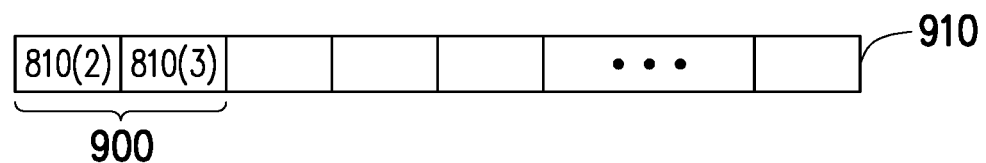
FIG. 9A is a buffer queue for managing uncorrectable data according to an exemplary embodiment of the invention.
Figure 9B:
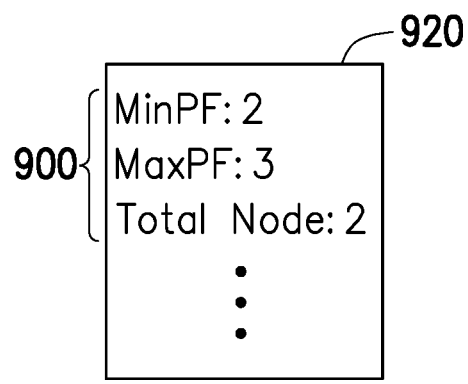
FIG. 9B is a data structure for managing uncorrectable data according to an exemplary embodiment of the invention.

FIG. 8A and FIG. 8B illustrate a buffer queue in a buffer memory management method according to an exemplary embodiment of the invention. FIG. 9A is a buffer queue for managing uncorrectable data according to an exemplary embodiment of the invention. FIG. 9B is a data structure for managing uncorrectable data according to an exemplary embodiment of the invention.

The above description of FIG. 7A and FIG. 7B illustrates the concept of the data reading method of the invention Hereinafter, detailed steps of the data reading method of the invention will be described in more detail with reference to FIG. 7A, FIG. 7B, FIG. 8A, FIG. 8B, FIG. 9A and FIG. 9B.

Referring to FIG. 7A, FIG. 8A, FIG. 9A and FIG. 9B together, in FIG. 7A, after the memory management circuit 502 reads the physical units 610(0) to 610(n) according to the first read command 701 to obtain the first data 710, the memory management circuit 502 temporarily stores the first data 710 in the buffer memory 510. For example, the first data 710 is stored in the buffer memory 510 in the form of a buffer queue 810 in FIG. 8A. In this exemplary embodiment of the invention, as shown in FIG. 8A, the buffer queue 810 includes a plurality of frames 810(0) to 810(n). The frames 810(0) to 810(n) store the data D1 to Dn corresponding to the physical units 610(0) to 610(n), respectively. The memory management circuit 502 identifies whether the uncorrectable data is stored in the physical units 610(0) to 610(n) according to the first data 710 by performing a decoding operation on each of the frames 810(0) to 810(n) of the buffer queue 810.

In this exemplary embodiment of the invention, after the memory management circuit 502 performs the decoding operation on each of the frames 810(0) to 810(n) of the buffer queue 810, the identified uncorrectable data D2 and D3 are read from the at least one first physical unit 610(2)~610(3) and temporarily stored in the frames 810(2) and 810(3) in the buffer queue 810. Accordingly, the memory management circuit 502 further generates mark information corresponding to the at least one first physical unit 610(2)~610(3). In an exemplary embodiment, as shown in FIG. 9A, the memory management circuit 502 records mark information 900 in a buffer queue 910 for managing the uncorrectable data. The marking information 900 includes description information of the at least one first physical unit 610(2)~610(3). In this exemplary embodiment, the description information are address information of the frames 810(2) and 810(3) in the buffer queue 810 where the uncorrectable data D2 and D3 are temporarily stored. However, the invention is not limited in this regard. For example, the description information may also be information of the logical addresses 612(2) and 612(3) of the at least one first physical unit 610(2)~610(3) where the uncorrectable data D2 and D3 are stored or physical address information. In particular, the buffer queue 910 for managing the uncorrectable data is a storage block partitioned from the random access memory 514. For example, 1 KB space of the random access memory 514 can store information of 256 frames. However, the invention is not limited in this regard. For example, the buffer queue 910 may also be stored in the buffer memory 510.

It is worth mentioning that, due to the limited space of the random access memory 514, if there are too many errors with uncorrectable error correction code (UECC) occurred in the read data, the buffer queue 910 for storing the mark information 900 may be insufficient. Therefore, in the exemplary embodiment of the invention, the memory management circuit 502 accesses the buffer queue 910 by a predetermined rule. The predetermined rule includes, for example, a First In First Out (FIFO) rule and a least recently used (LRU).

In another exemplary embodiment, as shown in FIG. 9B, the memory management circuit 502 records the mark information 900 in a data structure 920 for managing the uncorrectable data. The marking information 900 includes description information of the at least one first physical unit 610(2)~610(3). In this exemplary embodiment, the description information are start address information and end address information of the frames 810(2) and 810(3) in the buffer queue 810 where the uncorrectable data D2 and D3 are temporarily stored, and a total of the frames of the uncorrectable data. For example, the start address information is recorded as a minimum (MinPF): 2; the end address information is recorded as a maximum frame (MaxPF): 3; and the total of the frames (Total Node) is recorded as: 2. However, the invention is not limited in this regard. For example, the description information may also be start address information and end address information of the logical addresses 612(2) and 612(3) of the at least one first physical unit 610(2)~610(3) where the uncorrectable data D2 and D3 are stored, and a total of the logical addresses of the uncorrectable data, or start physical address information and end address information of the physical addresses and a total of the physical addresses of the uncorrectable data. Similarly, the data structure 920 may be stored in the random access memory 514 or the buffer memory 510.

Referring to FIG. 7B, FIG. 8A, FIG. 9A and FIG. 9B together, in FIG. 7B, because the first data 710 corresponding to the first read command 701 from the host system 11 includes the uncorrectable data D2 and D3, the host system 11 will send the second read command 702 again to try and read the same data. After the memory management circuit 502 reads the physical units 610(0) to 610(n) according to the second read command 702 to obtain the second data 720, the memory management circuit 502 temporarily stores the second data 720 in the buffer queue 810 of the buffer memory 510 shown in FIG. 8A. In particular, before the memory management circuit 502 performs the decoding operation on each of the frames 810(0) to 810(n) of the buffer queue 810, the memory management circuit 502 first determines whether one of the buffer queue 910 and the data structure 920 for managing the uncorrectable data is stored in the random access memory 514. In the case where the buffer queue 910 shown in FIG. 9A is stored in the random access memory 514, the memory management circuit 502 can learn that the frames 810(2) to 810(3) in the buffer queue 810 include the uncorrectable data D2 and D3 according to the mark information 900 in the buffer queue 910. Accordingly, in the buffer queue 810 shown in FIG. 8A, the memory management circuit 502 keeps a first part of data 801 of the second data 720 and discards a second part of data 802 of the second data 720. Here, the second part of data 802 includes the data D2 and the data D3 from the at least one first physical unit 610(2)~610(3). Then, the memory management circuit 502 decodes only the first part of data 801, and generates the response data 730 shown in FIG. 7B according to the decoded first part of data 801 and the padding data PD.

In another exemplary embodiment, the memory management circuit 502 determines that the data structure 920 for managing the uncorrectable data shown in FIG. 9B is stored in the random access memory 514. Accordingly, the memory management circuit 502 can leant that the frames 810(2) to 810(3) in the buffer queue 810 include the uncorrectable data D2 and D3 according to the mark information 900 in the data structure 920. Similarly, in the buffer queue 810 shown in FIG. 8A, the memory management circuit 502 keeps the first part of data 801 of the second data 720 and discards the second part of data 802 of the second data 720. Here, the second part of data 802 includes the data D2 and the data D3 from the at least one first physical unit 610(2)~610(3). Then, the memory management circuit 502 decodes only the first part of data 801, and generates the response data 730 shown in FIG. 7B according to the decoded first part of data 801 and the padding data PD. It is worth noting that, if the memory management circuit 502 determines that the buffer queue 910 and the data structure 920 for managing the uncorrectable data are stored in the random access memory 514, the memory management circuit 502 can generate the response data in response to the host system 11 according to one of the buffer queue 910 and the data structure 920 or referring to both the buffer queue 910 and the data structure 920.

Referring to FIG. 7B, FIG. 8A, FIG. 9A and FIG. 9B, in another exemplary embodiment of the invention, after the memory management circuit 502 receives the second read command 702, the memory management circuit 502 first determines whether the buffer queue 910 or the data structure 920 for managing the uncorrectable data shown in FIG. 9A or FIG. 9B is stored in the random access memory 514. For example, when at least one of the buffer queue 910 and the data structure 920 is present, the memory management circuit 502 can determine that the data D2 and the data D3 in the at least one first physical unit 610(2)~610(3) are the uncorrectable data according to the mark information in the buffer queue 910 or the data structure 920, and accordingly read the physical units 610(0) and 610(1) and the physical units 610(4) to 610(n) (a.k.a. at least one second physical unit (610(0), 610(1) and 610(4) to 610(n))) in the physical units 610(0) to 610(n) excluding the at least one first physical unit 610(2)~610(3). That is to say, in this exemplary embodiment, the second data 720 obtained by reading the at least one second physical unit (610(0), 610(1) and 610(4) to 610(n)) by the memory management circuit 502 only includes the data D0, the data D1 and the data D4 to the data Dn. Then, when temporarily storing the second data 720 to the buffer queue 810 of the buffer memory 510 shown in FIG. 8B, the memory management circuit 502 temporarily stores the padding data PD in the frame 810(2) and the frame 810(3) according to the mark information in the buffer queue 910 or the data structure 920, and temporarily stores the remaining data including the data D0, the data D1, the data D4 to the data Dn in the frame 810(0), the frame 810(1) and the frame 810(4) to the frame 810(n) in the buffer queue 810. Then, the memory management circuit 502 performs the decoding operation on each of the frames 810(0) to 810(n) of the buffer queue 810 to generate the response data 730 shown in FIG. 7B.

Based on the above exemplary embodiments, according to the data reading method that refers the buffer queue 910 and the data structure 920 recorded with the mark information, the problem of reduced performance caused by continuous decoding operations performed by the host system 11 can be solved when repeatedly trying to read the data that includes the uncorrectable data. It is worth mentioning that the uncorrectable data caused by high and low temperature changes during the operation of the memory storage device 10 may only be transient. Therefore, in another exemplary embodiment of the invention, after the memory storage device 10 is powered on again, the memory management circuit 502 resets the content of the buffer queue 910 and the data structure 920 so that the uncorrectable data caused by high and low temperature changes can be decoded again to thereby improve the correctness of the data.

Figure 10A:
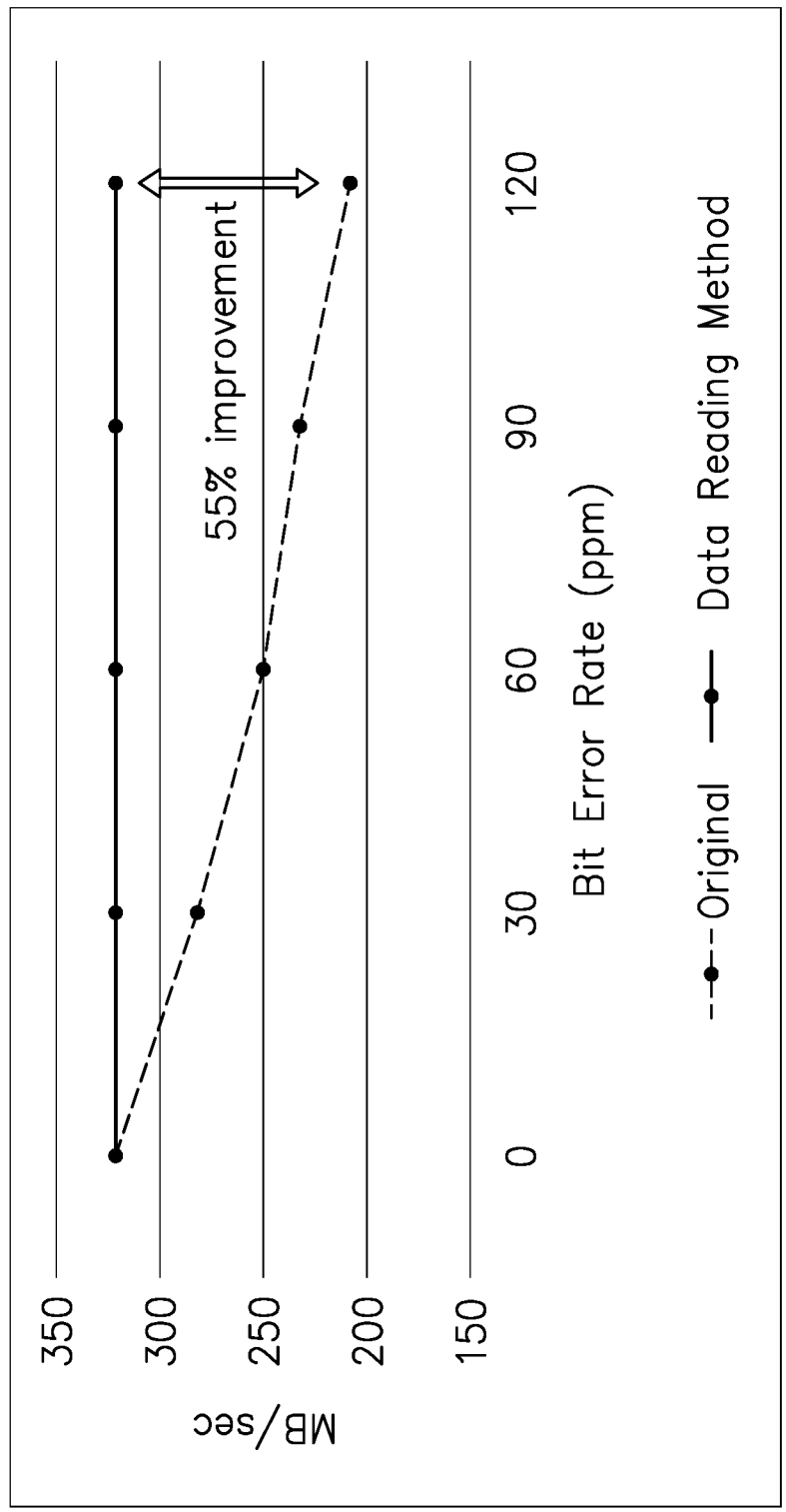
FIG. 10A is a schematic diagram illustrating a performance improvement of a data reading method in the case of sequential reading according to an exemplary embodiment of the invention.
Figure 10B:
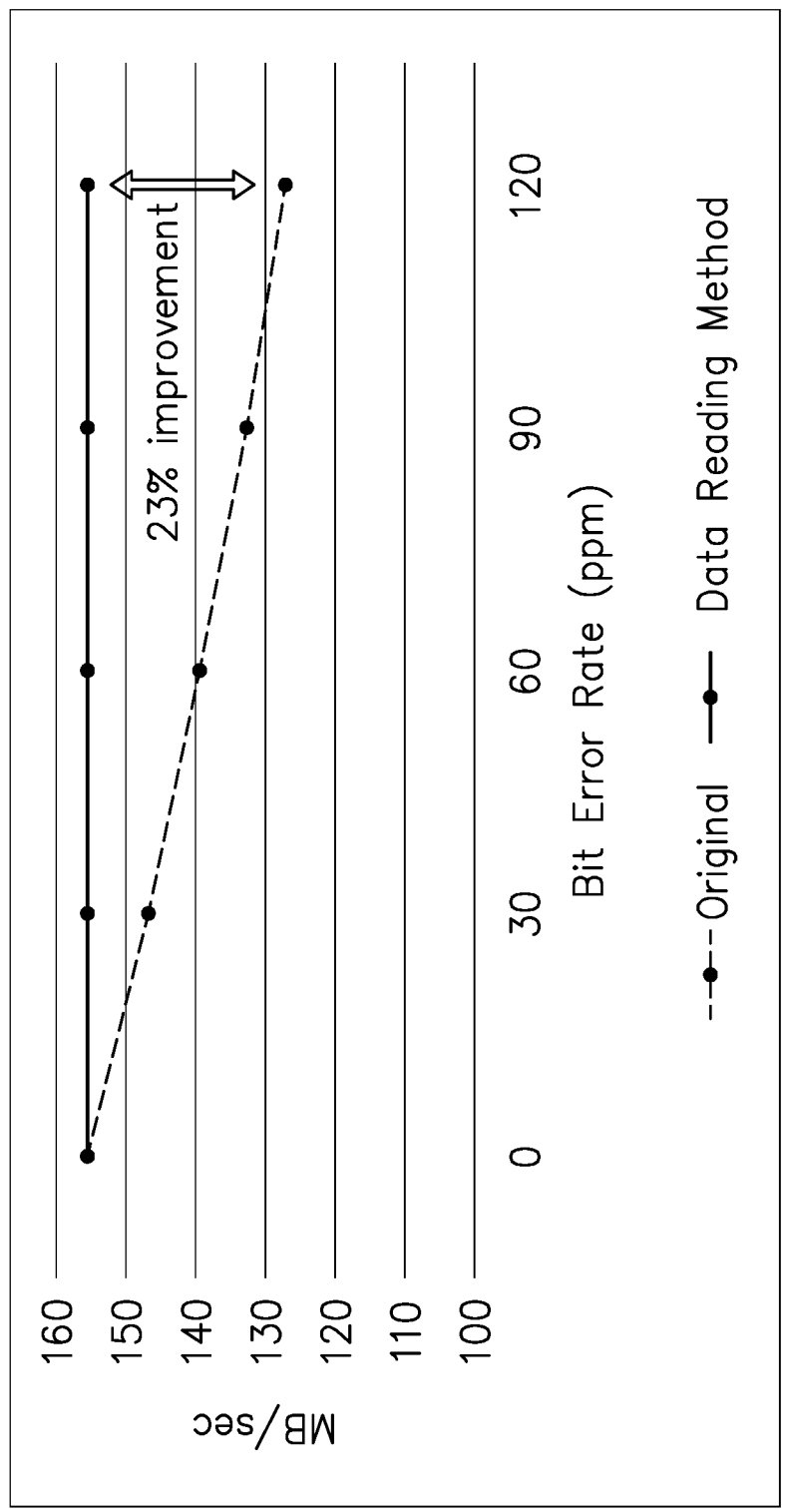
FIG. 10B is a schematic diagram illustrating a performance improvement of a data reading method in the case of random reading according to an exemplary embodiment of the invention.

FIG. 10A is a schematic diagram illustrating a performance improvement of a data reading method in the case of sequential reading according to an exemplary embodiment of the invention. FIG. 10B is a schematic diagram illustrating a performance improvement of a data reading method in the case of random reading according to an exemplary embodiment of the invention.

Referring to FIG. 10A, in the case of sequential reading, the data reading method of the invention can reduce invalid decoding operations on the uncorrectable data. Therefore, even when the uncorrectable data is being read, the performance can be maintained at the highest speed. As shown in FIG. 10A, compared to the reading speed of the data reading method without using the invention, the data reading method of the invention can achieve an improvement of up to 55% when the bit error rate is 120 ppm. Referring to FIG. 10B, in the case of random reading, since the processing speed of random reading is slower than that of sequential reading, the magnitude of increase is smaller. Nevertheless, with the data reading method of the invention, an improvement of 23% can be achieved when the bit error rate is 120 ppm.

Figure 11:
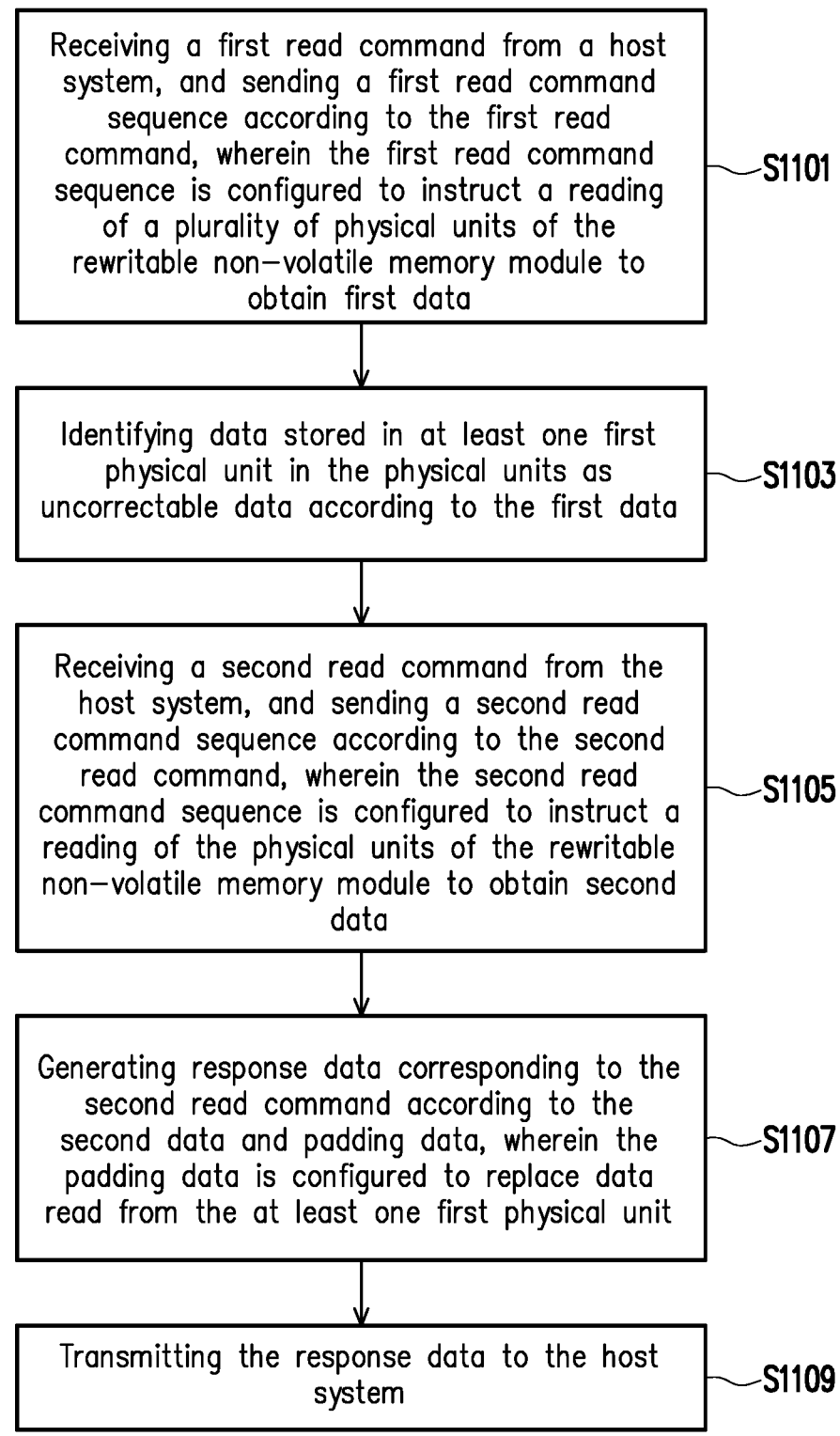
FIG. 11 is a flowchart illustrating a data reading method according to an exemplary embodiment.

FIG. 11 is a flowchart illustrating a data reading method according to an exemplary embodiment. Referring to FIG. 11, in step S1101, the memory management circuit 502 receives a first read command from a host system, and sends a first read command sequence according to the first read command, wherein the first read command sequence is configured to instruct a reading of a plurality of physical units of the rewritable non-volatile memory module to obtain first data. In step S1103, the memory management circuit 502 identifies data stored in at least one first physical unit in the physical units as uncorrectable data according to the first data. In step S1105, the memory management circuit 502 receives a second command from the host system, and sends a second read command sequence according to the second read command, wherein the second read command sequence is configured to instruct a reading of the physical units of the rewritable non-volatile memory module to obtain second data. In step S1107, the memory management circuit 502 generates response data corresponding to the second read command according to the second data and padding data, wherein the padding data is configured to replace data read from the at least one first physical unit. In step S1109, the memory management circuit 502 transmits the response data to the host system.

Nevertheless, steps depicted in FIG. 11 are described in detail as above so that related description thereof is omitted hereinafter. It should be noted that, the steps depicted in FIG. 11 may be implemented as a plurality of program codes or circuits, which are not particularly limited in the invention. Moreover, the method disclosed in FIG. 11 may be implemented by reference with above exemplary embodiments, or may be implemented separately, which are not particularly limited in the invention.

In summary, the data reading method, the memory storage device and the memory control circuit unit proposed according to the exemplary embodiments of the invention can record the mark information of the physical units storing the uncorrectable data when the host system is trying to read the uncorrectable data. In this way, it is possible to avoid the invalid decoding operations on the uncorrectable data in the continuous data based on the mark information, thereby improving the overall data reading speed. On the other hand, after the memory storage device is powered on again, by resetting the buffer queue storing the mark information, the temporary uncorrectable data caused by the high and low temperature changes can be successfully decoded again, thereby improving the correctness the data. As a result, the data reading method in the exemplary embodiments of the invention can maintain the reading speed of the memory storage device and improve its overall operating performance.

The previously described exemplary embodiments of the present invention have the advantages aforementioned, wherein the advantages aforementioned not required in all versions of the present invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data reading method for a rewritable non-volatile memory module, the data reading method comprising:
   receiving a first read command from a host system, and sending a first read command sequence according to the first read command, wherein the first read command sequence is configured to instruct a reading of a plurality of physical units of the rewritable non-volatile memory module to obtain first data;
   identifying data stored in at least one first physical unit in the physical units as uncorrectable data according to the first data;
   receiving a second command from the host system, and sending a second read command sequence according to the second read command, wherein the second read command sequence is configured to instruct a reading of the physical units of the rewritable non-volatile memory module to obtain second data;
   generating response data corresponding to the second read command according to the second data and padding data, wherein the padding data is configured to replace data read from the at least one first physical unit; and
   transmitting the response data to the host system.

2. The data reading method of claim 1, wherein the step of identifying the data stored in the at least one first physical unit in the physical units as the uncorrectable data according to the first data comprises:
   decoding the first data; and
   identifying the data stored in the at least one first physical unit in the physical units as the uncorrectable data according to a decoding result of the first data.

3. The data reading method of claim 1, wherein the step of identifying the data stored in the at least one first physical unit in the physical units as the uncorrectable data according to the first data comprises:
   generating mark information corresponding to the at least one first physical unit, wherein the mark information reflects that the data in the at least one first physical unit is the uncorrectable data.

4. The data reading method of claim 3, wherein the marking information comprises description information of the at least one first physical unit.

5. The data reading method of claim 1, wherein the step of generating the response data corresponding to the second read command according to the second data and the padding data comprises:
   keeping a first part of data of the second data and discarding a second part of data of the second data, wherein the second part of data comprises data from the at least one first physical unit.

6. The data reading method of claim 5, wherein the step of generating the response data corresponding to the second read command according to the second data and the padding data further comprises:
   decoding the first part of data; and
   generating the response data according to the decoded first part of data and the padding data.

7. The data reading method of claim 1, wherein the second read command sequence is further configured to instruct a reading of at least one second physical unit in the physical units excluding the at least one first physical unit to obtain the second data.

8. A memory storage device, comprising:
   a connection interface unit configured to couple to a host system;
   a rewritable non-volatile memory module; and
   a memory control circuit unit, coupled to the connection interface unit and the rewritable non-volatile memory module,
   wherein the memory control circuit unit is configured to receive a first read command from a host system, and send a first read command sequence according to the first read command, wherein the first read command sequence is configured to instruct a reading of a plurality of physical units of the rewritable non-volatile memory module to obtain first data,
   the memory control circuit unit is further configured to identify data stored in at least one first physical unit in the physical units as uncorrectable data according to the first data,
   the memory control circuit unit is further configured to receive a second command from the host system, and send a second read command sequence according to the second read command, wherein the second read command sequence is configured to instruct a reading of the physical units of the rewritable non-volatile memory module to obtain second data,
   the memory control circuit unit is further configured to generate response data corresponding to the second read command according to the second data and padding data, wherein the padding data is configured to replace data read from the at least one first physical unit, and
   the memory control circuit unit is further configured to transmit the response data to the host system.

9. The memory storage device of claim 8, wherein the operation of identifying the data stored in the at least one first physical unit in the physical units as the uncorrectable data according to the first data comprises:
   decoding the first data; and
   identifying the data stored in the at least one first physical unit in the physical units as the uncorrectable data according to a decoding result of the first data.

10. The memory storage device of claim 8, wherein the operation of identifying the data stored in the at least one first physical unit in the physical units as the uncorrectable data according to the first data comprises:
   generating mark information corresponding to the at least one first physical unit, wherein the mark information reflects that the data in the at least one first physical unit is the uncorrectable data.

11. The memory storage device of claim 10, wherein the marking information comprises description information of the at least one first physical unit.

12. The memory storage device of claim 8, wherein the operation of generating the response data corresponding to the second read command according to the second data and the padding data comprises:
  keeping a first part of data of the second data and discarding a second part of data of the second data, wherein the second part of data comprises data from the at least one first physical unit.

13. The memory storage device of claim 12, wherein the operation of generating the response data corresponding to the second read command according to the second data and the padding data further comprises:
  decoding the first part of data; and
  generating the response data according to the decoded first part of data and the padding data.

14. The memory storage device of claim 8, wherein the second read command sequence is further configured to instruct a reading of at least one second physical unit in the physical units excluding the at least one first physical unit to obtain the second data.

15. A memory control circuit unit for controlling a rewritable non-volatile memory module, the memory control circuit unit comprising:
  a host interface, configured to couple to a host system,
  a memory interface, configured to couple to the rewritable non-volatile memory module; and
  a memory management circuit, coupled to the host interface and the memory interface;
  wherein the memory management circuit is configured to receive a first read command from a host system, and send a first read command sequence according to the first read command, wherein the first read command sequence is configured to instruct a reading of a plurality of physical units of the rewritable non-volatile memory module to obtain first data,
  the memory management circuit is further configured to identify data stored in at least one first physical unit in the physical units as uncorrectable data according to the first data,
  the memory management circuit is further configured to receive a second command from the host system, and send a second read command sequence according to the second read command, wherein the second read command sequence is configured to instruct a reading of the physical units of the rewritable non-volatile memory module to obtain second data,
  the memory management circuit is further configured to generate response data corresponding to the second read command according to the second data and padding data, wherein the padding data is configured to replace data read from the at least one first physical unit, and
  the memory management circuit is further configured to transmit the response data to the host system.

16. The memory control circuit unit of claim 15, wherein the operation of identifying the data stored in the at least one first physical unit in the physical units as the uncorrectable data according to the first data comprises:
  decoding the first data; and
  identifying the data stored in the at least one first physical unit in the physical units as the uncorrectable data according to a decoding result of the first data.

17. The memory control circuit unit of claim 15, wherein the operation of identifying the data stored in the at least one first physical unit in the physical units as the uncorrectable data according to the first data comprises:
  generating mark information corresponding to the at least one first physical unit, wherein the mark information reflects that the data in the at least one first physical unit is the uncorrectable data.

18. The memory control circuit unit of claim 17, wherein the marking information comprises description information of the at least one first physical unit.

19. The memory control circuit unit of claim 15, wherein the operation of generating the response data corresponding to the second read command according to the second data and the padding data comprises:
  keeping a first part of data of the second data and discarding a second part of data of the second data, wherein the second part of data comprises data from the at least one first physical unit.

20. The memory control circuit unit of claim 19, wherein the operation of generating the response data corresponding to the second read command according to the second data and the padding data further comprises:
  decoding the first part of data; and
  generating the response data according to the decoded first part of data and the padding data.

21. The memory control circuit unit of claim 15, wherein the second read command sequence is further configured to instruct a reading of at least one second physical unit in the physical units excluding the at least one first physical unit to obtain the second data.

* * * * *